United States Patent [19]

Shimizu et al.

[11] Patent Number: 5,378,774
[45] Date of Patent: Jan. 3, 1995

[54] POLYMER SCALE PREVENTIVE AGENT

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 159,250

[22] Filed: Nov. 30, 1993

[30] Foreign Application Priority Data

Nov. 30, 1992 [JP] Japan ................... 4-345440

[51] Int. Cl.$^6$ .............................. C08F 2/00
[52] U.S. Cl. ........................ 526/62; 526/74
[58] Field of Search ............. 526/62, 74; 524/192

[56] References Cited

U.S. PATENT DOCUMENTS 5,115,051 5/1992 Shimizu et al. ............ 526/62
5,142,003 8/1992 Usuki et al. ................ 526/62

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

A polymer scale preventive agent for use in polymerization of a monomer having an ethylenically unsaturated double bond, comprising (A) at least one member selected from the group consisting of (A-1) an aromatic compound having at least 2 amino groups and (A-2) an aromatic dibasic acid dihydrazide compound, (B) an inorganic colloid, and (C) a water-soluble polymer compound. This agent is low in toxicity and high in safety. The agent is used for forming a coating on the inner wall surfaces of a polymerization vessel. Such a vessel is effective in preventing polymer scale deposition during polymerization not only on the areas in the liquid phase but also at and in the vicinity of the interface between the gas and liquid phases therein, and is useful in producing a polymer product that shows very few fish eyes and good whiteness when formed into sheets or the like.

12 Claims, No Drawings

POLYMER SCALE PREVENTIVE AGENT

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

As a method of polymerizing a monomer having an ethylenically unsaturated double bond, there are known suspension polymerization, emulsion polymerization, solution polymerization, gas phase polymerization and bulk polymerization. In any type of the polymerizations, polymer scale is liable to be deposited on areas with which the monomer comes into contact during polymerization, such as inner walls, agitation equipment and so on of a polymerization vessel.

Deposition of the polymer scale results in disadvantages that the yield of the polymer and cooling capacity of the polymerization vessel are lowered; that the polymer scale may peel off and mix into a polymeric product, thereby impairing the quality of formed products obtained by processing the polymeric product; and that removal of such polymer scale is extremely laborious and hence time-consuming. Further, the polymer scale contains unreacted monomers and operators may be exposed thereto, which may cause physical disorders in the operators.

Heretofore, as a method of preventing the polymer scale deposition on inner walls and so forth of polymerization vessels in the polymerization of a monomer having an ethylenically unsaturated double bond, there is known a method of coating a suitable substance as a polymer scale preventive agent on the inner walls and so forth of the polymerization vessel. As the suitable substance for the polymer scale prevention, for example, there are disclosed a special polar compound in Japanese Patent Publication (KOKOKU) No. 45-030343 (1970), a dyestuff or pigment in Japanese Patent Publication (KOKOKU) Nos. 45-030835 (1970) and 52-024953 (1977), an aromatic amine compound in Japanese Pre-examination Patent Publication (KOKAI) No. 51-050887 (1976), and a reaction product of a phenolic compound with an aromatic aldehyde in Japanese Pre-examination Patent Publication (KOKAI) No. 55-054317 (1980).

Meanwhile, where polymeric products obtained by polymerization are processed into formed products such as sheets, etc., the formed products are required to have a high whiteness. When a polymeric product is formed into a sheet or the like without adding any coloring agent, the resulting formed product is more or less colored. Such coloration is called initial coloration, which is desired to be as low as possible. Specifically, a luminosity index (L) of the formed product, given by the Hunter's color difference equation in JIS Z 8730 (1980), is required to be, for example, 70 or more in the case of vinyl chloride polymers and 80 or more in the case of SBR.

However, when a conventional polymer scale preventive agent, such as a dyestuff or pigment described in said Japanese Patent Publication (KOKOKU) Nos. 45-030835 (1970) and 52-024953 (1977), an aromatic amine compound in Japanese Pre-examination Patent Publication (KOKAI) No. 51-050887 (1976), and a reaction product of a phenolic compound with an aromatic amine in Japanese Pre-examination Patent Publication (KOKAI) No. 55-054317 (1980), is coated on the inner wall surface of a polymerization vessel to form a coating and a polymerization is carried out therein, the resulting polymeric product gives a formed product, by processing, which has a low whiteness and is inferior in initial coloration. Specifically, the above-mentioned luminosity index (L) is 65 or less in the case of the formed product of vinyl chloride polymer. This is considered as a result of the fact that many of conventional polymer scale preventive agents are colored. That is, since such colored agents may be peeled or dissolved during polymerization and mix into polymeric products, the resulting formed products will exhibit a low whiteness.

Further, said conventional polymer scale preventive agents can prevent polymer scale deposition on the areas in the liquid phase of a polymerization vessel, but have a drawback that polymer scale deposition is liable to occur at and in the vicinity of the interface between a gas phase and a liquid phase which is located at the upper section of the polymerization vessel.

Once polymer scale is deposited at or in the vicinity of the interface between the gas phase and the liquid phase, the deposited scale will grow gradually as polymerization runs are repeated, and at last peel off from the inner wall, etc., to get mixed with the polymeric product. If the polymeric product containing the polymer scale is processed into formed products such as sheets or the like, the polymer scale causes increase in fish eyes in the formed products, thereby lowering seriously the quality of the products.

Further, many of the conventional polymer scale preventive agents are toxic, which are typically shown by poisons such as aniline, nitrobenzene and formaldehyde, exemplified as a polar compound in Japanese Patent Publication (KOKOKU) No. 45-030343 (1970), and by a compound containing a heavy metal such as chromium and lead, exemplified as a pigment in Japanese Patent Publication (KOKOKU) No. 45-030835 (1970). In addition, there is a fear of carcinogenicity among some dyestuffs which are described in Japanese Patent Publication (KOKOKU) Nos. 45-030835 (1970) and 52-024953 (1977). Therefore, in the case of using such materials for polymer scale prevention, there are problems of safety and hygiene for operators.

SUMMARY OF THE INVENTION

It is an object of the present invention to provide a polymer scale preventive agent for use in polymerization of a monomer having an ethylenically unsaturated double bond that can prevent effectively the deposition of polymer scale not only in the areas in the liquid phase but also at and in the vicinity of the interface between the gas and liquid phases, that makes it possible to produce polymeric products with a very small number of fish eyes and a low initial coloration after being processed into formed products such as sheet or the like, and that is substantially free from problems of safety and hygiene, including toxicity; a polymerization vessel using the same; and a process of producing a polymer using the vessel.

In order to attain the above object, the present invention provides a polymer scale preventive agent for use in polymerization of a monomer having an ethylenically unsaturated double bond, comprising (A) at least one member selected from the group consisting of (A-1) an aromatic compound having at least 2 amino groups and (A-2) an aromatic dibasic acid dihydrazide compound, (B) an inorganic colloid, and (C) a water-soluble polymer compound.

The present invention also provides a polymerization vessel for polymerizing a monomer having an ethylenically unsaturated double bond, comprising a coating on its inner wall surfaces, wherein said coating comprises (A) at least one member selected from the group consisting of (A-1) an aromatic compound having at least 2 amino groups and (A-2) an aromatic dibasic acid dihydrazide compound, (B) an inorganic colloid, and (C) a water-soluble polymer compound.

Further, the present invention provides a process of producing a polymer of a monomer having an ethylenically unsaturated double bond, which comprises polymerizing the monomer in a polymerization vessel having a coating on its inner wall surfaces, whereby polymer scale is prevented from being deposited, wherein said coating comprises (A) at least one member selected from the group consisting of (A-1) an aromatic compound having at least 2 amino groups and (A-2) an aromatic dibasic acid dihydrazide compound, (B) an inorganic colloid and (C) a water-soluble polymer compound.

According to the present invention, deposition of polymer scale can be effectively prevented not only on the areas in the liquid phase but also at and in the vicinity of the interface between the gas and liquid phases in a polymerization vessel. Therefore, the present invention makes it unnecessary to conduct the operation of removing the polymer scale after every polymerization run, and the productivity is thereby improved.

Further, since the polymer scale preventive agent of the present invention is substantially low in toxicity and high in safety, it is free from problems of safety and hygiene for operators.

Moreover, when the polymeric product obtained by the application of the present invention is processed into formed products such as sheets, the resulting formed products have very few fish eyes. In addition, the formed products obtained as above are low in initial coloration. That is, the formed products exhibit a luminosity index (L) in the Hunter's color difference equation described in JIS Z 8730 (1980) of 70 or more in the case of vinyl chloride polymers and 80 or more in the case of SBR.

DETAILED DESCRIPTION OF PREFERRED EMBODIMENTS (A) At least one member selected from the group consisting of (A-1) an aromatic compound having at least 2 amino groups and (A-2) an aromatic dibasic acid dihydrazide compound The aromatic dibasic acid dihydrazide compound having at least 2 amino groups (—NH2) is the compound represented, for example, by the following general formulas (1) to (11-2):

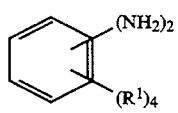

wherein the plural $R^1$ may be the same or different and are each an atom or group selected from the group consisting of —H, —HN2, —Cl, —OH, —NO2, —COCH3, —OCH3, —N(CH3)2, —COOH, —SO3H, and an alkyl group of 1 to 3 carbon atoms,

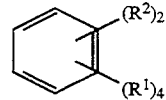

wherein the plural $R^1$ may be the same or different and are as defined above, and the plural $R^2$ may be the same or different and are each an alkyl group of 1 to 10 carbon atoms having an amino group,

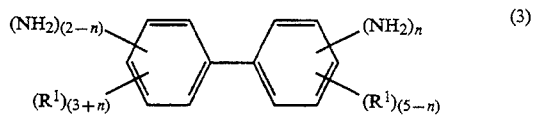

wherein the $R^1$ groups may be the same or different and are as defined above, and n is an integer of 1 or 2,

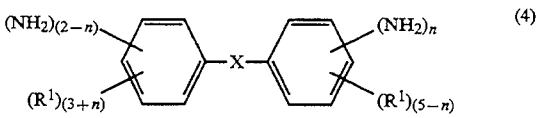

wherein the plural $R^1$ may be the same or different and are as defined above, n is also as defined above, and X is an alkylene group of 1 to 5 carbon atoms, —CH=CH—, —N=N—, —NH—, —N(CH3)—, —CONH—, —P(=O)H—, —SO2—, —O—, —S—, —Si(R)2—(- where R is an alkyl group of 1 to 10 carbon atoms), or the group having the formula:

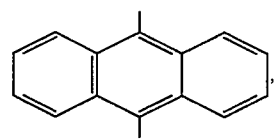

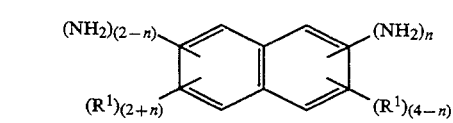

wherein the plural $R^1$ may be the same or different and are as defined above, and n is also as defined above,

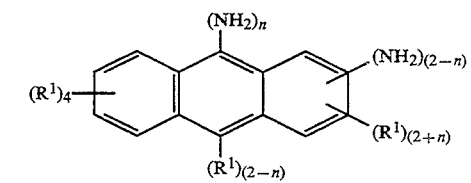

wherein in the formulas (6-1) and (6-2) the plural $R^1$ may be the same or different and are as defined above, and n is also as defined above,

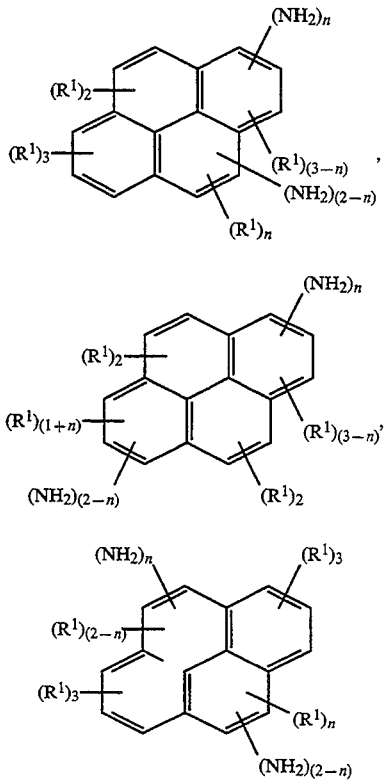

wherein in the formulas (7-1), (7-2) and (7-3) the plural $R^1$ may be the same or different and are as defined above, and n is also as defined above,

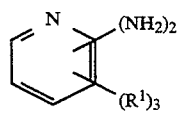

wherein the plural $R^1$ may be the same or different and are as defined above,

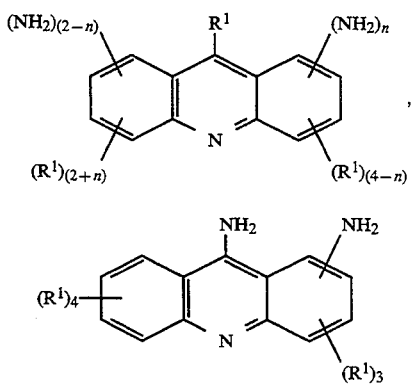

wherein in the formulas (9-1) and (9-2) the plural $R^1$ may be the same or different and are as defined above, and n is also as defined above,

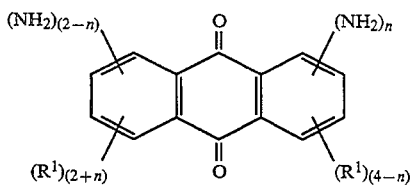

wherein the plural $R^1$ may be the same or different and are as defined above, and n is also as defined above,

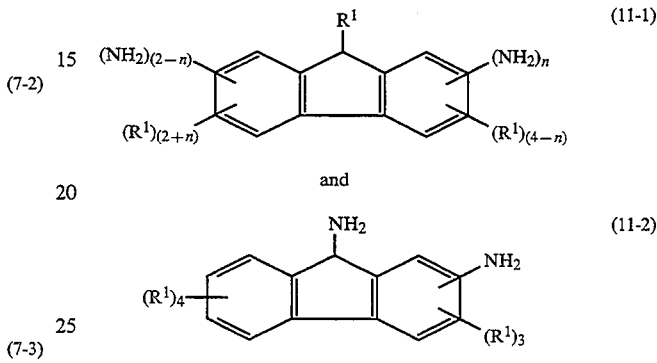

wherein in the formulas (11-1) and (11-2) the plural $R^1$ may be the same or different and are as defined above, and n is also as defined above.

Specific compounds represented by the above general al formula (1) include, for example, o-, m-, and p-diaminobenzene, 3,4- and 3,5-diaminobenzoic acid, 2,5-diaminobenzene sulfonic acid, 3,4-diaminochlorobenzene, 3,4-diaminophenol, 1,2-diamino-4-nitrobenzene, 2,4-diamino-1-nitrobenzene, 2,4-, 2,5- and 2,6-diaminotoluene, 2,5- and 2,6-diamino-m-xylene, 2,5- and 2,6-diamino-p-xylene and the like.

Specific compounds represented by the above general al formula (2) include, for example, 2,4-bis(β-amino-t-butyl)toluene, p-bis(2-methyl-4-aminopentyl)benzene, p-bis(1,1-dimethyl-5-aminopentyl)benzene and the like.

Specific compounds represented by the above general formula (3) include, for example, 4,4-diamino-3,3'-biphenyldiol, 3,3'-dimethyl-4,4'-diaminobiphenyl, 3,3'-dimethoxy-4,4'-diaminobiphenyl, 4,4'-diaminobiphenyl and the like.

Specific compounds represented by the above general formula (4) include, for example, 2,4-diaminoazobenzene, 4,4'-diaminodiphenylether, 4,4'-diaminodiphenylamine, 4,4'-diaminodiphenylmethane, 3,3'- and 4,4'-diaminodiphenylsulfone, 4,4'-diaminobenzanilide, 4,4'diaminostilbene, 4,4'-diaminostilbene-2,2'-disulfonic acid, 9,10-bis(4-aminophenyl)anthracene, 4,4'-diaminodiphenylsulfide, 4,4'diaminodiphenylpropane, bis(4-aminophenyl)diethylsilane, bis(4-aminophenyl)phosphineoxide, bis(4-aminophenyl)-N-methylamine and the like.

Specific compounds represented by the above general formula (5) include, for example, 1,5- and 1,8-diaminonaphthalene and the like.

Specific compounds represented by the above general formula (6-1) or (6-2) include, for example, 1,4-and 1,5-diaminoanthracene and the like.

Specific compounds represented by the above general formulas (7-1) to (7-3) include, for example, 1,6-, 1,8-, 3,5- and 5,10-diaminopyrene and the like.

Specific compounds represented by the above general formula (8) include, for example, 2,3-, 3,4- and 2,6-diaminopyridine and the like.

Specific compounds represented by the above general formula (9-1) or (9-2) include, for example, 3,6-diaminoacridine and the like.

Specific compounds represented by the above general formula (10) include, for example, 1,2-, 1,4- and 2,6-diaminoanthraquinone and the like.

Specific compounds represented by the above general formula (11-1) or (11-2) include, for example, 2,3-and 2,7-diaminofluorene and the like.

(A-2) Aromatic dibasic acid dihydrazide compound

The aromatic dibasic acid dihydrazide compound (A-2) is an aromatic compound having 2 groups of —CONHNH$_2$ and is a compound represented, for example, by the following general formula (12):

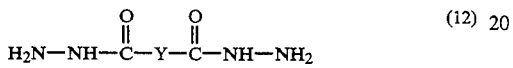  (12)

wherein Y is a divalent aromatic group expressed by the formulas (13-1) to (13-4):

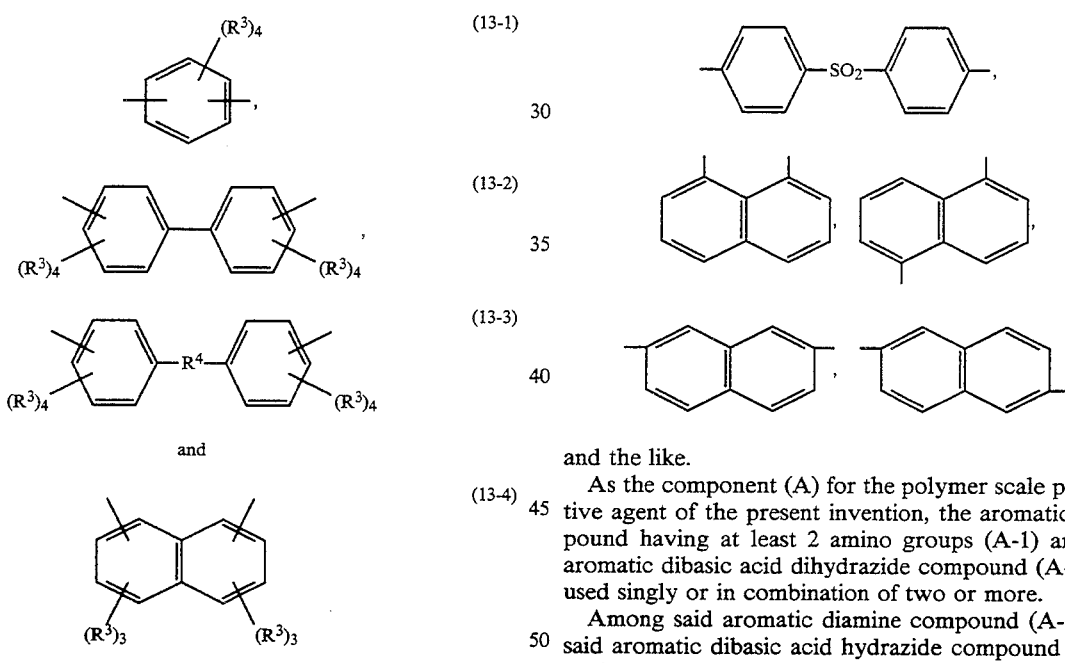

where the plural R$^3$ may be the same or different and are each an atom or group selected from the group consisting of —H, —OH, —CH$_3$, —CH$_2$CH$_3$, —Cl, —Br, —I, —OCH$_3$, —OCH$_2$CH$_3$, —COOH and —SO$_3$H, and R$^4$ is an atom or group selected from the group consisting of —O—, —CH$_2$—, —S—, —C(CH$_3$)$_2$— and —SO$_2$—.

In the above general formula (12), Y includes specifically the following compounds:

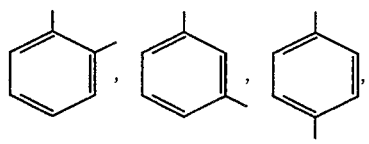

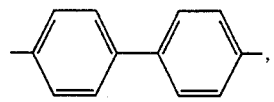

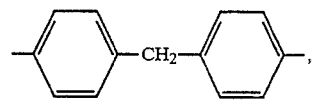

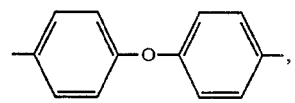

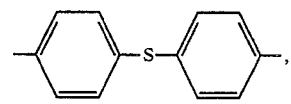

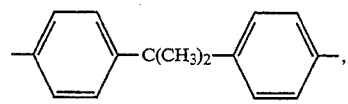

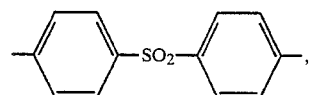

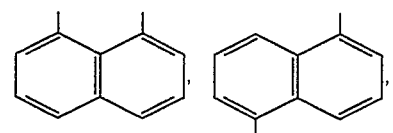

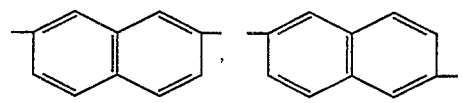

and the like.

As the component (A) for the polymer scale preventive agent of the present invention, the aromatic compound having at least 2 amino groups (A-1) and the aromatic dibasic acid dihydrazide compound (A-2) are used singly or in combination of two or more.

Among said aromatic diamine compound (A-1) and said aromatic dibasic acid hydrazide compound (A-2), preferable are 4,4'-diaminodiphenylpropane, 4,4'-diaminobenzanilide, 2,7-diaminofluorene, bis(4-aminophenyl)diethylsilane, bis(4-aminophenyl)phosphineoxide and an isophthaloyl dihydrazide expressed by the following formula:

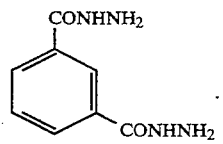

Inorganic colloid (B)

The inorganic colloid (B) serves the object of the present invention, since it is not toxic. The inorganic colloid is a colloid produced by a dispersion method using water as a dispersion medium or a condensation method, and its colloidal particles are in the range of 1 to 500 mu in size.

The inorganic colloid includes specifically, for example, a colloid of oxide or hydroxide of a metal selected from the group consisting of aluminum, thorium, titanium, zirconium, antimony, tin, iron and the like; a colloid of tungstic acid, vanadium pentoxide, gold or silver; silver iodide sol; and a colloid of selenium, sulfur, silica or the like. Among these, preferable are the colloids of oxides or hydroxides of a metal selected from the group consisting of aluminum, titanium, zirconium, tin and iron and the colloidal silica.

Said inorganic colloid (B) may be used singly or in combination of two or more.

Water-soluble polymer compound (C)

The water-soluble polymer compound (C) includes, for example, an amphoteric polymer compound such as gelatin and casein; an anionic polymer compound such as polyacrylic acid, polystyrenesulfonic acid, carboxymethyl cellulose and alginic acid: a cationic nitrogen-containing polymer compound such as polyvinylpyrrolidone, chitosan and polyacrylamide; and a hydroxyl group-containing polymer compound such as polyvinylalcohol, hydroxyethyl cellulose, hydroxypropyl cellulose and pectin.

Among the above water-soluble polymer compounds (C), preferable are gelatin, casein, polyacrylic acid, carboxymethyl cellulose, polyvinylpyrrolidone and pectin.

Said water-soluble polymer compound may be used singly or in combination of two or more.

The polymer scale preventive agent according to the present invention is used, for example, in the form of a coating on inner wall surfaces of a polymerization vessel and the like, whereby deposition of polymer scale on the inner wall surfaces and the like is prevented. To form such a coating on the inner wall surfaces of a polymerization vessel and the like, in general, the polymer scale preventive agent is used in the state of a solution or a dispersion in a suitable medium, that is, as a coating liquid.

Preparation of coating liquid

The coating liquid as above can be prepared by adding the above-described components (A), (B) and (C) to a suitable solvent.

The solvent used for preparation of the coating liquid include, for example, water; alcohols such as methanol, ethanol, propanol, butanol, 2-butanol, 2-methyl-1-propanol, 2-methyl-2-propanol, 3-methyl-1-butanol, 2-methyl-2-butanol, and 2-pentanol; ketones such as acetone, methyl ethyl ketone, and methyl isobutyl ketone; esters such as methyl formate, ethyl formate, methyl acetate, ethyl acetate, and methyl acetoacetate; ethers such as 4-methyldioxolane, and ethylene glycol diethyl ether; furans; and aprotic solvents such as dimethyl formamide, dimethyl sulfoxide, and acetonitrile. These solvents may be used either singly or as a mixed solvent of two or more.

Among the above solvents, preferred are water and mixed solvents of welter and an organic solvent miscible with water. The organic solvent miscible with water includes, for example, alcohols such as methanol, ethanol, propanol and the like; ketones such as acetone, methyl ethyl ketone and the like; and esters such as methyl acetate, ethyl acetate and the like. Where a mixed solvent of water and the organic solvent miscible with water is used, the proportion of the organic solvent is preferably so selected as to avoid dangers of inflammation, explosion or the like and obviate safety problems in handling, e.g., toxicity. Specifically, the amount of the organic solvent in the mixed solvent is preferably 50% by weight or less, more preferably 30% by weight or less.

Further, the content of the component (B) is normally 0.1 to 1,000 parts by weight, preferably 1 to 600 parts by weight, per 100 parts by weight of the component (A). In addition, the content of the component (C) is normally 0.1 to 1,000 parts by weight, preferably 1 to 300 parts by weight, per 100 parts by weight of the component (A). If the component (B) and/or the component (C) are/is too much or too small relative to the component (A), there is a fear that the resulting condensation product will be poor in polymer scale-preventing effect.

The total concentration of the components (A), (B) and (C) in the coating liquid is not particularly limited, so long as the total coating weight described later can be obtained. Normally, however, the total concentration ranges from 0.005 to 10% by weight, and preferably from 0.03 to 1% by weight.

Formation of the coating

The coating liquid prepared in the manner as above is applied to the inner wall surfaces of a polymerization vessel and then dried sufficiently at a temperature from room temperature to 100° C., for instance, followed by washing with water if necessary, to form the coating.

The coating liquid is preferably applied to not only the inner wall surfaces of a polymerization vessel but also other areas with which the monomer comes into contact during polymerization to form the coating on such areas. For example, on a stirring shaft, stirring blades, baffles, condensers, headers, search coil, bolts, nuts, etc.

More preferably, for formation of the coating, the coating liquid is applied to areas with which monomers do not come into contact during polymerization but on which polymer scale may deposit, for example, the areas with which unreacted monomers comes into contact of an unreacted monomer recovery system; specifically the inner surfaces, etc., of equipment and pipes of the recovery system. Specifically, such areas include the inner surfaces of monomer distillation columns, condensers, monomer stock tanks and valves.

The method of applying the coating liquid to the inner wall surfaces of a polymerization vessel is not particularly limited, and includes, for example, the brush coating, spray coating, the method of filing the polymerization vessel with the coating liquid followed by withdrawal thereof, and automatic coating methods as disclosed in Japanese Pre-examination Patent Publication (KOKAI) Nos. 57-061001 (1982) and 55-036288 (1980), and Japanese Pre-examination Patent Publication (KOHYO) Nos. 56-501116 (1981) and 56-501117 (1981), and Japanese Pre-examination Publication (KOKAI) No. 59-011303 (1984), etc.

The method of drying wet coated surfaces provided by application of the coating liquid, is not limited, either. Following methods can be used. That is, a method in which, after the coating liquid is applied, hot air with at a suitable elevated temperature is blown to the coated surface, and a method in which the inner wall surface of a polymerization vessel and the surfaces of other parts to be coated are previously heated to from 30° to 80° C., and the coating liquid is directly applied to the heated inner wall surfaces, etc. After dried, the coated surfaces are washed with water if necessary.

The coating thus obtained normally has a coating weight of 0.001 to 5 g/m², and preferably from 0.05 to 2 g/m².

The coating operation is not necessarily to be conducted every batch of polymerization, since the formed coating has good durability and retains the polymer scale-preventing action. Therefore, productivity is improved.

Polymerization

After the formation of the coating on the inner wall surfaces of a polymerization vessel, and preferably also on other parts with which monomer may come into contact during polymerization, polymerization is carried out in accordance with conventional procedures. That is, a monomer having an ethylenically unsaturated double bond, a polymerization initiator, and optionally a polymerization medium such as water, a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or salts thereof; and diene monomers such as butadiene, chloroprene and isoprene; styrene; acrylonitrile; vinylidene halides; and vinyl ethers; and the like. These may be used singly or in combination of two or more.

There are no particular restrictions on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged, whereupon the pressure inside the polymerization vessel usually becomes from 0.5 to 30 kgf/cm².G. Besides, said polymerization initiator may be added after the monomer is charged. Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to De polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to that of from 0 to 7 kgf/cm².G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. For example, in the case of polymerizing vinyl chloride, polymerization is carried out at 30° to 80° C.; in the case of polymerizing styrene, polymerization is carried out at 50° to 150° C.

The present invention makes it possible to prevent polymer scale from depositing, independent of materials constituting the inner wall surfaces, etc., of a polymerization vessel. For example, this invention can prevent deposition of polymer scale even in the case that polymerization is carried out in a polymerization vessel made of a steel including stainless steel or lined with glass.

Any additive materials that have been conventionally added in a polymerization system can be used without any limitation. More specifically, this invention can effectively prevent polymer scale from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl)peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents including natural or synthetic polymeric compounds such as partially saponified polyvinyl alcohols, polyacrylic acids, vinyl acetate/maleic anhydride copolymers, cellulose derivatives such as hydroxypropyl methyl cellulose, and pyrogallol-acetone resin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers suck as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans, e.g. t-dodecyl mercaptan, and trichloroethylene; and pH adjusters.

The polymer scale preventive agent of the present invention may be added to a polymerization mass in addition to the formation of the coating, so that the scale-preventing effect is further improved. The amount of the polymer scale preventive agent to be added to the polymerization mass is preferably in the range of about 10 to about 1,000 ppm based on the whole weight of the monomers charged. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other experiments are working examples of the present invention.

Preparation of coating liquids (Coating liquid No. 1–No. 15)

Coating liquid Nos. 1–15 were prepared using (A) an aromatic compound having at least 2 amino groups and/or an aromatic dibasic acid dihydrazide compound, (B) an inorganic colloid, (C) a water-soluble polymer compound and a solvent as shown in Table 1 so as to meet the conditions (solvent composition, total concentration of (A)+(B)+(C), and weight ratio of (A):(B):(C)) as shown in Table 1, respectively. The inorganic colloid (C) (shown as (a) to (g) in Table 1), used for preparation of the coating liquids, is given in Table 2.

Further, the isophthaloyl dihydrazide used as the component (A) for preparation of the coating liquid No. 13 is a compound expressed by the following formula:

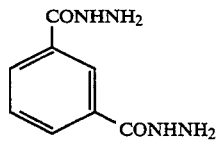

Example 1 (Experiment Nos. 101 to 115)

In each experiment, polymerization was conducted using a stainless steel polymerization vessel with an inner capacity of 1,000 liters and having a stirrer.

In each experiment, the coating liquid shown in Table 3 was applied to the inner wall, the stirring shaft, the stirring blades and other areas with which a monomer comes into contact of the polymerization vessel. The thus applied coating liquid was dried by heating at 60° C. for 15 minutes to form a coating, and the inside of the polymerization vessel was washed with water.

Thereafter, in each experiment polymerization was carried out as follows.

Into the polymerization vessel in which the coating was formed as above, 400 kg of water, 200 kg of vinyl chloride, 250 g of a partially saponified polyvinyl alcohol, 25 g of hydroxypropylmethyl cellulose and 75 g of 3,5,5-trimethylhexanoylperoxide were charged, followed by polymerization with stirring at 57° C. for 6 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations of polymerization and washing with water, but not including the coating operation, was repeated. The number of repetition times is shown in Table 3. After the final batch was over, the amount of polymer scale deposited on an area located in the liquid phase and on an area in

TABLE 1

| No. | (A) Aromatic compd. having amino groups and/or aromatic dihydrazide compd. | (B) Inorganic colloid | (C) Water soluble polymer compd. | Solvent (weight ratio) | Total conc. of (A) + (B) + (C) (wt. %) | Weight ratio, (A):(B):(C) |
|---|---|---|---|---|---|---|
| 1* | — | — | — | — | — | — |
| 2* | 4,4'-Diaminobenzanilide | — | — | Methanol | 0.3 | — |
| 3* | — | b | — | Water:Methanol (70:30) | 0.3 | — |
| 4* | — | — | Gelatin | Water:Methanol (70:30) | 0.3 | — |
| 5* | — | b | Gelatin | Water:Methanol (70:30) | 0.3 | 0:100:100 |
| 6 | 4,4'-Diaminobenzanilide | b | Gelatin | Water:Methanol (70:30) | 0.3 | 100:100:100 |
| 7 | 4,4'-Diaminodiphenylpropane | a | Casein | Water:Acetone (70:30) | 0.3 | 100:300:100 |
| 8 | 4,4'-Diaminodiphenylsulfide | a | Polyacrylic acid | Water:Methanol (80:20) | 0.3 | 100:300:50 |
| 9 | Bis(4-aminophenyl)diethyl silane | a | Sodium salt of carboxymethyl cellulose | Water:Methanol (80:20) | 0.3 | 100:150:100 |
| 10 | Bis(4-aminophenyl)phosphine oxide | a | Polyvinyl pyrolidone | Water:Methanol (80:20) | 0.3 | 100:150:30 |
| 11 | 3,5-Diaminobenzoic acid | e | Pectin | Water:Methanol (80:20) | 0.3 | 100:300:10 |
| 12 | 2,6-Diaminopyridine | g | Polyvinyl alcohol | Water:Methanol (90:10) | 0.3 | 100:50:100 |
| 13 | Isophthaloyldihydrazide | c | Sodium alginate | Water:Methanol (90:10) | 0.3 | 100:50:200 |
| 14 | 2,7-Diaminofluorene | d | Hydroxypropyl cellulose | Water:Methanol (90:10) | 0.3 | 100:100:50 |
| 15 | 4,4'-Diaminobenzanilide | f | Polyacryl amide | Water:Methanol (90:10) | 0.3 | 100:100:50 |

TABLE 2

| (B) Inorganic colloid | Size of colloidal particles (mμ) | Trade name (material) | Producer |
|---|---|---|---|
| a | 10 ~ 20 | Snowtex 0 (colloidal silica) | Nissan Chemical Industries, Ltd. |
| b | 5 ~ 7 | Snowtex CXS-9 (colloidal silica) | Nissan Chemical Industries, Ltd. |
| c | 100 ~ 200 | Titanium oxide | Nissan Chemical Industries, Ltd. |
| d | 10 ~ 20 | Aluminium oxide | Nissan Chemical Industries, Ltd. |
| e | 60 ~ 70 | Zirconium oxide | Nissan Chemical Industries, Ltd. |
| f | 20 ~ 50 | Tin oxide | Nissan Chemical Industries, Ltd. |
| g | 10 ~ 15 | Iron hydroxide | Prepared by the inventors | the vicinity of the interface between the gas and liquid phases in the polymerization vessel, was measured according to the method below. The results are given in Table 3.

Measurement of the amount of polymer scale

The scale deposited in an area of 10 cm square on the inner wall of the polymerization vessel is scraped off with a stainless steel spatula as completely as possible to be confirmed with naked eyes, and then the scraped scale is weighed on a balance. Thereafter, the amount of the deposited scale per area of 1 m² is obtained by multi- The value of L is determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K. K.) in accordance with JIS Z 8722. As the geometric condition for illumination and being illuminated, the condition d defined in section 4.3.1 of JIS Z 8722 is adopted. Next, L is calculated based on the equation: $L = 10Y^{\frac{1}{2}}$ described in JIS Z 8730 (1980).

TABLE 3

| Exp. No. | Coating liquid No. | Repetition Number of batch (batches) | Results of polymerization | | | |
|---|---|---|---|---|---|---|
| | | | Polymer scale amount (g/m²) | | | Luminosity index (L) |
| | | | Liquid phase | Around interface of gas and liquid phases | Number of fish eyes | |
| 101* | 1* | 1 | 1050 | 2450 | 35 | 73.0 |
| 102* | 2* | 2 | 20 | 1300 | 28 | 73.0 |
| 103* | 3* | 1 | 140 | 1250 | 32 | 73.0 |
| 104* | 4* | 1 | 550 | 2020 | 34 | 73.0 |
| 105* | 5* | 2 | 17 | 1100 | 27 | 73.0 |
| 106 | 6 | 7 | 0 | 48 | 18 | 73.0 |
| 107 | 7 | 7 | 0 | 53 | 13 | 73.0 |
| 108 | 8 | 7 | 0 | 50 | 13 | 73.0 |
| 109 | 9 | 7 | 0 | 45 | 14 | 73.0 |
| 110 | 10 | 7 | 0 | 49 | 12 | 73.0 |
| 111 | 11 | 6 | 2 | 90 | 31 | 73.0 |
| 112 | 12 | 6 | 4 | 110 | 30 | 73.0 |
| 113 | 13 | 6 | 4 | 100 | 31 | 73.0 |
| 114 | 14 | 6 | 3 | 88 | 29 | 73.0 |
| 115 | 15 | 6 | 6 | 95 | 29 | 73.0 | plying the measured value by 100.

The number of fish eyes which may appear when a polymer is formed into sheet was measured with respect to the polymers produced in the experiments according to the method below. The results are given in Table 3.

Measurement of fish eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 cm² by light transmission.

Further, to evaluate initial coloration at the time a polymer is formed into sheet, luminosity index (L) was measured according to the method below. The results are given in Table 3.

Measurement of luminosity index (L)

A hundred parts by weight of a polymer, 1 part by weight of a tin laurate stabilizing agent (trade name: TS-101, product of Akisima Chemical Co.) and 0.5 part by weight of a cadmium stabilizing agent (trade name: C-100J, product of Katsuta Kako Co.), and 50 parts by weight of DOP as plasticizer are kneaded at 160° C. for 5 minutes with a twin roll mill, and then formed into a sheet 1 mm thick. Subsequently, this sheet is placed in a mold measuring 4 cm×4 cm×1.5 cm (depth), is heated at 160° C. under a pressure of 65 to 70 kgf/cm² for 0.2 hour to prepare a test specimen. This test specimen is measured for luminosity index (L) in the Hunter's color difference equation described in JIS Z 8730 (1980). The higher the value of L of the test specimen, the higher the whiteness (namely, the lower the initial coloration) of the polymer.

Example 2 (Experiment Nos. 201 to 209)

In each experiment, polymerization was conducted using a stainless steel polymerization vessel with an inner capacity of 20 liters and having a stirrer.

In each experiment, the coating liquid shown in Table 4 was applied to the inner wall, the stirring shaft, the stirring blades and other areas with which a monomer comes into contact of the polymerization vessel. The applied coating liquid was dried by heating at 60° C. for 15 minutes to form a coating, which was then washed with water.

Thereafter, in each experiment polymerization was carried out as follows. Into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the atmosphere inside the polymerization vessel was replaced with a nitrogen gas, 1.3 kg of styrene and 3.8 kg of butadiene were charged, followed by polymerization at 59° C. for 20 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations of polymerization and washing with water, but not including the coating operation, was repeated the number of times shown in Table 4. After the final batch was over, the amount of polymer scale deposited on an area located in the liquid phase and on an area in the vicinity of the interface between the gas and liquid phases in the polymerization vessel, was measured in the same manner as in Example 1. The results are shown in Table 4.

Further, to evaluate initial coloration at the time a polymer is formed into sheet, luminosity index (L) was measured according to the method below. The results are given in Table 4.

measurement of luminosity index (L)

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm² for 0.2 hour and press molded under the final pressure of 80 kgf/cm² to prepare a test specimen.

This test specimen was measured for luminosity index (L) in the same manner as in Example 1.

TABLE 4

| Exp. No. | Coating liquid No. | Repetition number of batch (batches) | Results of polymerization | | Luminosity index (L) |
| | | | Polymer scale amount (g/m²) | | |
| | | | Liquid phase | Around interface of gas and liquid phases | |
|---|---|---|---|---|---|
| 201* | 1* | 1 | 300 | 660 | 85.0 |
| 202* | 2* | 2 | 15 | 150 | 85.0 |
| 203* | 3* | 1 | 180 | 480 | 85.0 |
| 204* | 4* | 1 | 220 | 520 | 85.0 |
| 205* | 5* | 2 | 12 | 120 | 85.0 |
| 206 | 6 | 4 | 0 | 50 | 85.0 |
| 207 | 7 | 4 | 0 | 56 | 85.0 |
| 208 | 8 | 4 | 0 | 48 | 85.0 |
| 209 | 9 | 4 | 0 | 40 | 85.0 |

We claim:

1. A process of producing a polymer of monomer having an ethylenically unsaturated double bond, which comprises polymerizing the monomer in a polymerization vessel having a polymer scale preventive coating on its inner wall surfaces, wherein said coating comprises (A) at least one member selected from the group consisting of (A-1) an aromatic compound having at least 2 amino groups selected from the group consisting of the compounds represented by the formulas (1) to (11-2):

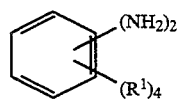    (1)

wherein the plural R¹ may be the same or different and each are an atom or group selected from the group consisting of —H, —NH₂, —Cl, —OH, —NO₂, —COCH₃, —OCH₃, —N(CH₃)₂, —COOH, —SO₃H and alkyl groups having 1 to 3 carbon atoms,

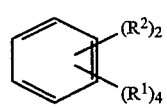    (2)

wherein the plural R¹ may be the same or different and each are as defined above, and the plural R² may be the same or different and each are an amino group-containing alkyl group having 1 to 10 carbon atoms,

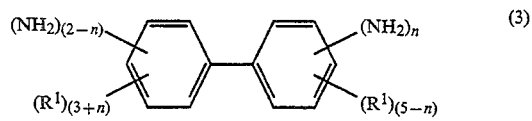    (3)

wherein the plural R¹ may be the same or different and each are as defined above, and n is an integer of 1 or 2,

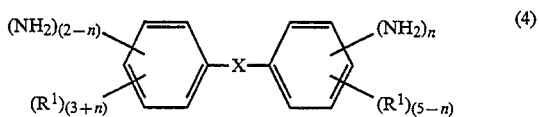    (4)

wherein the plural R¹ may be the same or different and each are as defined above, n is also as defined above, and X is an alkylene group having 1 to 5 carbon atoms, —CH=CH—, —N=N—, —NH—, —N(CH₃)—, —CONH—, —P(=O) H—, —SO₂—, —O—, —S—, —Si(R)₂—(where R is an alkyl group of 1 to 10 carbon atoms), or the group having the formula:

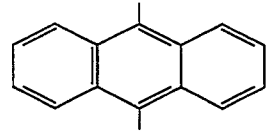

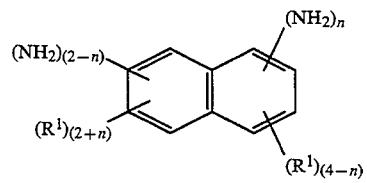    (5)

wherein the plural R¹ may be the same or different and each are as defined above, and n is also as defined above,

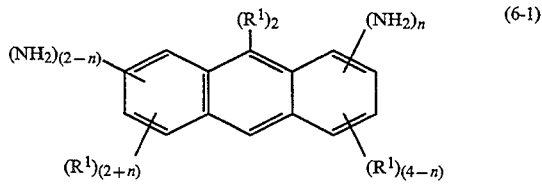    (6-1)

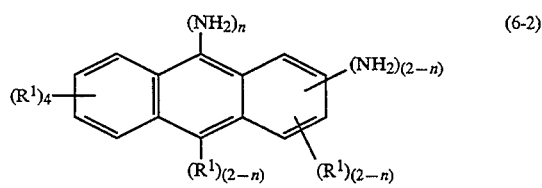    (6-2)

wherein in the formulas (6-1) and (6-2) the plural R may be the same or different and each are as defined above, and n is also as defined above,

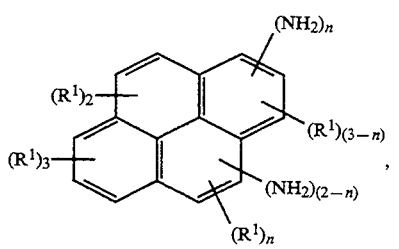 (7-1)

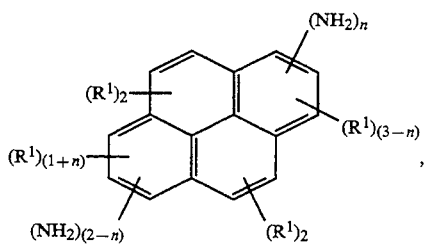 (7-2)

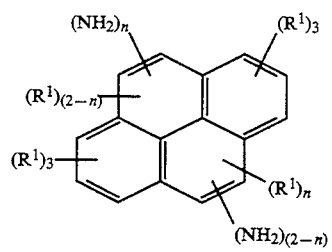 (7-3)

wherein in the formulas (7-1), (7-2) and (7-3) the plural R may be the same or different and each are as defined above, and n is also as defined above,

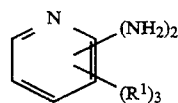 (8)

wherein the plural $R^1$ may be the same or different and each are as defined above,

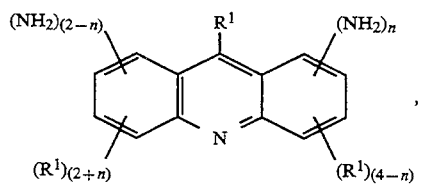 (9-1)

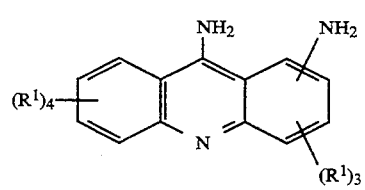 (9-2)

wherein in the formulas (9-1) and (9-2) the plural $R^1$ max be the same or different and each are as defined above, and n is also as defined above,

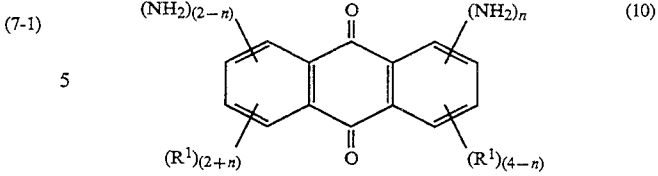 (10)

wherein the plural $R^1$ may be the same or different and each are as defined above, and n is also as defined above,

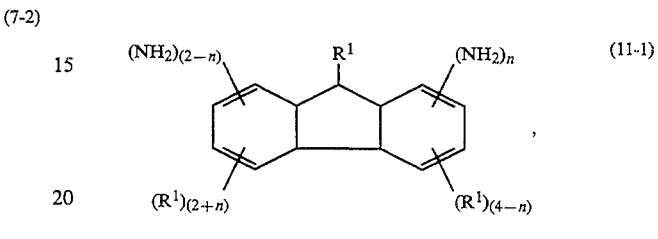 (11-1)

and

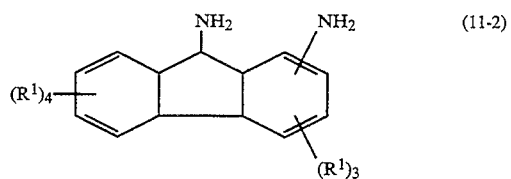 (11-2)

wherein in the formulas (11-1) and (11-2) the plural $R^1$ may be the same or different and each are as defined above, n is also as defined above and (A-2) are aromatic dibasic acid dihydrazide compound, (B) an inorganic colloid, and (C) a water-soluble polymer compound.

2. The process of claim 1, wherein said polymerization is conducted as suspension polymerization, emulsion polymerization, solution polymerization, bulk polymerization or gas phase polymerization.

3. The process of claim 1, wherein said monomer is selected from the group consisting of vinyl halides; vinyl esters; acrylic acid, methacrylic acid and their esters and salts; maleic acid, fumaric acid and their esters and anhydrides; diene monomers; styrene; acrylonitrile; vinylidene halides; and vinyl ethers.

4. The process of claim 11, wherein the component (A) comprises a compound represented by the formula (12):

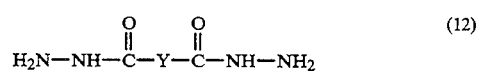 (12)

where Y is a divalent aromatic group selected from the group consisting of the groups expressed by the formulas (13-1) to (13-4):

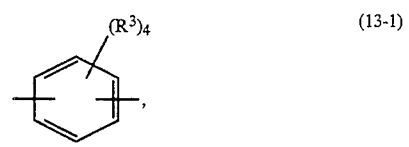 (13-1)

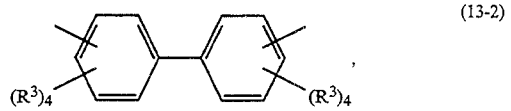 (13-2)

-continued

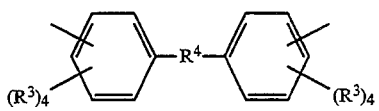

and

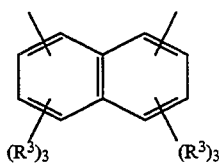

wherein in the formula (13-1) to (13-4) the plural R³ may be the same or different and each are an atom or group selected from the group consisting of —H, —OH, —CH₃, —CH₂CH₃, —Cl, —Br —I, —OCH₃, —OCH₂CH₃, —COOH and —S0₃H, and R⁴ in the formula (13-3) is an atom or group selected from the group consisting of —O—, —CH₂, —S—, —C(CH₃)₂— and —SO₂—.

5. The process of claim 1, wherein the component (A) comprises at least one compound selected from the group consisting of 4,4'-diaminodiphenylpropane, 4,4'-diaminobenzanilide, 2,7-diaminofluorene, bis(4-aminophenyl)diethylsilane, bis(4-aminophenyl)phosphineoxide and isophthaloyldihydrazide expressed by the formula:

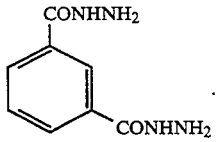

6. The process of claim 1, wherein the component (B) comprises a colloid of silica, an oxide, a hydroxide or a mixture of two or three thereof, said oxide or hydroxide being the oxide or hydroxide of a metal selected from the group consisting of aluminum, titanium, zirconium, tin and iron.

7. The process of claim 1, wherein the component (C) comprises a compound selected from the group consisting of gelatin, casein, polyacrylic acid, carboxymethyl cellulose, polyvinylpyrrolidone and pectin.

8. The process of claim 1, wherein the components (A), (B) and (C) are dissolved or dispersed in a solvent to form a liquid used to form said coating.

9. The process of claim 8, wherein the solvent is water.

10. The process of claim 8, wherein the solvent is a mixed solvent of water and an organic solvent miscible with water, and the mixed solvent contains the organic solvent in the amount of 50% by weight or less.

11. The process of claim 8, wherein component (B) is present in an amount of 0.1 to 1,000 parts by weight per 100 parts by weight of component (A) and component (C) is present in an amount of 0.1 to 1,000 parts by weight per 100 parts by weight of component (A).

12. The process of claim 8, wherein components (A), (B) and (C) are present in said liquid at a total concentration in the range of 0.005 to 10% by weight.

* * * * *